(No Model.)
W. F. ZAPF.
MUSTACHE SPOON.
No. 553,093. Patented Jan. 14, 1896.
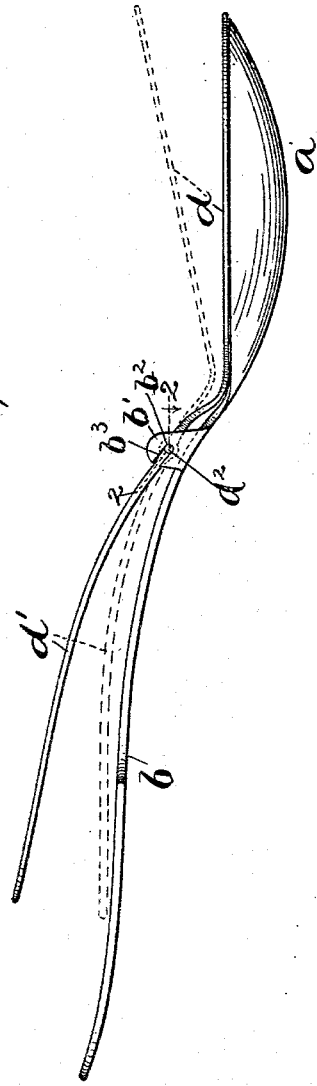
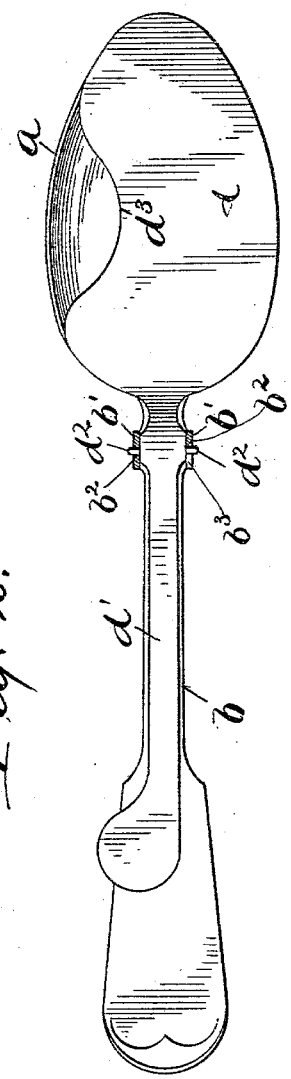
Witnesses.
E. B. Gilchrist
Inventor.
William F. Zapf
By M. D. Leggett & Co.
his Attorneys.

UNITED STATES PATENT OFFICE.

WILLIAM F. ZAPF, OF CLEVELAND, OHIO, ASSIGNOR OF ONE-HALF TO CHARLES B. MANN, OF SAME PLACE.

MUSTACHE-SPOON.

SPECIFICATION forming part of Letters Patent No. 553,093, dated January 14, 1896.

Application filed April 27, 1895. Serial No. 547,345. (No model.)

*To all whom it may concern:*

Be it known that I, WILLIAM F. ZAPF, of Cleveland, in the county of Cuyahoga and State of Ohio, have invented certain new and useful Improvements in Mustache-Spoons; and I do hereby declare the following to be a full, clear, and exact description of the invention, such as will enable others skilled in the art to which it pertains to make and use the same.

My invention relates to improvements in mustache-spoons; and it consists in certain features of construction and combinations of parts hereinafter described, and pointed out in the claim.

In the accompanying drawings, Figure 1 is a side elevation of a spoon embodying my invention, showing the cover of the bowl of the spoon in dotted lines in its upwardly-tilted or open position. Fig. 2 is a top plan of the same, partly in section, on line 2 2, Fig. 1.

Referring to the drawings, $a$ designates the bowl of the spoon, and $b$ its handle, that, at or near the bowl, is shown provided with two upwardly-projecting ears $b'$, arranged at opposite edges of the handle, respectively.

The bowl of the spoon is adapted to be partially closed by a cover $d$, that is provided with a handle $d'$, shown extending along the upper side of the bowl-handle between the aforesaid ears of the bowl-handle and to near the outer end of the bowl-handle, where it is within convenient reach of the thumb or finger of the hand engaged in holding the spoon. The cover-handle, adjacent to the upwardly-projecting ears of the bowl-handle, is shown provided with two trunnions $d^2$ arranged at opposite edges, respectively, of the cover-handle and engaging corresponding holes $b^2$ in said ears, and one of said holes is preferably elongated to and open at the edge of the respective ear, as at $b^3$, to accommodate the removal of the handle-bearing cover for cleaning and other purposes.

The handle of the cover, in the closed position of the latter, inclines upwardly from its pivotal connection with the spoon-handle away from the latter, as shown in solid lines, Fig. 1, so that when the cover-handle is depressed the cover shall be tilted upwardly or opened, as shown in dotted lines in same figure.

The cover is cut away at the central portion of the forward side of the spoon, as at $d^3$, to form a discharge-opening for the bowl of the spoon, and the size of the cover is such that it completely covers the spoon-bowl except at the aforesaid discharge-opening.

The removability of the handle-bearing cover renders the spoon capable of being used for stirring and other purposes.

What I claim is—

In a mustache-spoon, the combination with the bowl and its handle that, at or near its inner end, is provided with two upwardly-projecting ears arranged a suitable distance apart, of a handle-bearing cover for the bowl, said cover being shaped to form a discharge-opening for the spoon-bowl and the handle of the cover being provided with trunnions journaled in the aforesaid ears, the trunnion-engaging hole in one of said ears being elongated to the edge of the ear, substantially as shown, for the purpose specified.

In testimony whereof I sign this specification, in the presence of two witnesses, this 16th day of April, 1895.

WILLIAM F. ZAPF.

Witnesses:
C. H. DORER,
L. WARD HOOVER.